United States Patent [19]

Draaisma et al.

[11] Patent Number: 6,097,571
[45] Date of Patent: Aug. 1, 2000

[54] MAGNETIC HEAD AND SYSTEM FOR CONTROLLING THE POSITION OF A MAGNETIC HEAD

[75] Inventors: Eeltje A. Draaisma; Abraham Hoogendoorn, both of Eindhoven, Netherlands

[73] Assignee: Onstream, Inc., Loveland, Colo.

[21] Appl. No.: 09/003,279

[22] Filed: Jan. 6, 1998

Related U.S. Application Data

[62] Division of application No. 08/620,078, Mar. 21, 1996, Pat. No. 5,966,276.

[30] Foreign Application Priority Data

Mar. 24, 1995 [EP] European Pat. Off. .............. 95200742

[51] Int. Cl.[7] .................................................... G11B 5/29
[52] U.S. Cl. .......................................... 360/125; 360/121
[58] Field of Search ............................. 360/77.01, 77.05, 360/77.07, 77.11, 119, 121, 122, 125, 126

[56] References Cited

U.S. PATENT DOCUMENTS

| | | | |
|---|---|---|---|
| 3,859,664 | 1/1975 | Chynoweth et al. ................... | 360/121 |
| 4,318,141 | 3/1982 | Haynes ................................. | 360/77.01 |
| 4,439,793 | 3/1984 | Nater .................................... | 360/121 |
| 4,652,945 | 3/1987 | Marchant ............................. | 360/77.01 |
| 4,729,048 | 3/1988 | Imakoshi et al. ..................... | 360/121 |
| 4,884,156 | 11/1989 | Miyakawa et al. .................... | 360/121 |
| 4,903,151 | 2/1990 | Mizukami et al. .................. | 360/77.12 |
| 4,996,609 | 2/1991 | Joannou ................................ | 360/121 |
| 5,121,270 | 6/1992 | Alcudia et al. ..................... | 360/77.01 |
| 5,210,667 | 5/1993 | Zammit ................................. | 360/121 |
| 5,321,570 | 6/1994 | Behr et al. ............................ | 360/121 |
| 5,335,127 | 8/1994 | Nagata et al. ......................... | 360/113 |
| 5,452,165 | 9/1995 | Chen et al. ............................ | 360/121 |
| 5,488,525 | 1/1996 | Adams et al. ........................ | 360/121 |

OTHER PUBLICATIONS

IBM Technical Disclosure Bulletin, "Interleaved Multielement Magnetic Head", Kington, vol. 15, No. 6, p. 2035, Nov. 1972.

*Primary Examiner*—David L. Ometz
*Attorney, Agent, or Firm*—Welsh & Katz, Ltd.

[57] ABSTRACT

A servosystem for controlling the position of a magnetic head with respect to the tracks of a magnetic recording medium which is relatively movable with respect to the head and has a plurality of juxtaposed tracks, including a read head for simultaneously reading information signals and servosignals stored in the tracks, the read head having a head face and a layer structure comprising parallel read units, each having a read gap and extending substantially transversely to the head face, the read gaps of two adjacent read units each extending between a magnetically conducting common pole terminating in the head face and an individual pole terminating in the head face.

11 Claims, 5 Drawing Sheets

MAGNETIC HEAD AND SYSTEM FOR CONTROLLING THE POSITION OF A MAGNETIC HEAD

CROSS REFERENCE TO RELATED

This is a Divisional of application Ser. No. 08/620,078, filed Mar. 21, 1996, now U.S. Pat. No. 5,966,276.

BACKGROUND OF THE INVENTION

The invention relates to a magnetic head, particularly a write head, provided with a head face having a longitudinal direction along which a magnetic recording medium can be relatively moved with respect to the magnetic head, and a width direction oriented transversely to the longitudinal direction, and further provided with transducing gaps terminating in the head face.

The invention also relates to a device for writing signals in a magnetic recording medium, comprising a write head and means for relatively moving the recording medium with respect to the magnetic head along the contact face.

The invention further relates to a servosystem for controlling the position of a magnetic head with respect to tracks of a magnetizable recording medium which can be relatively moved with respect to the head and has a plurality of juxtaposed tracks.

The invention further relates to a read head for use in the servosystem.

A magnetic recording system is known from U.S. Pat. No. 4,318,141, in which use is made of buried servo or track position indication signals for the purpose of tracking. For writing servosignals, use is made of a magnetic head which is provided with a write winding and a single write gap. The write gap has a relatively large gap length so that the servosignals can be recorded to a large depth in the recording medium. The magnetic head further has a single write/read gap which, viewed in the track direction, is present behind said write gap. In accordance with a first method, the write/read gap is used in combination with a write circuit for storing data signals in a less deep part of the recording medium, while the servosignals are read simultaneously. In accordance with a second method, the recorded data signals and the recorded servosignals are read simultaneously. A drawback of the known device and the magnetic head used therein is that only one write gap is present so that only one information track can be written and read.

OBJECTS AND SUMMARY OF THE INVENTION

It is an object of the invention to provide a magnetic head which can write signals, particularly servosignals, simultaneously in various tracks.

The magnetic head according to the invention is characterized by the presence of a structure having integrated, juxtaposed write units extending substantially transversely to the longitudinal direction and the width direction and each being provided with at least one write gap, at least one write gap of the one write unit and at least one write gap of the other write unit of two adjacent write units, preferably every two adjacent write units- being situated in mutually different planes which are oriented substantially transversely to the longitudinal direction. The magnetic head according to the invention provides the possibility of writing tracks of different information contiguous to each other on a recording medium. In a magnetic system using a buried servosystem, this has the advantage that information signals can be written and read from information tracks provided across two adjacent servotracks, in which servosignals are written by means of the magnetic head according to the invention.

An embodiment of the magnetic head according to the invention is characterized in that, of two adjacent write units, preferably every two adjacent write units-, the write gaps situated in mutually different planes are adjacent to the same plane oriented substantially transversely to the width direction. In this multichannel magnetic head, the write units are contiguous to each other, which has the advantage that contiguous tracks, i.e. without an interspace, are written on the recording medium; in other words, the effective distance between the tracks is zero. This is of essential importance for using buried servosystems in magnetic recording systems. Moreover, the indicated effect may be of essential importance to increase the storage capacity of magnetic media.

The magnetic head according to the invention is particularly suitable for recording servosignals on a magnetic medium by means of which a write/read head unit can be positioned with respect to the tracks present on the magnetic medium. During writing and/or reading information signals, a read portion of the write/read head unit detects, the position of the servotracks formed by the write head according to the invention by reading servo-information.

A magnetic recording medium can be formatted by means of the magnetic head according to the invention by forming a plurality of servotracks with signals having wavelengths which are long with respect to the wavelengths of the information signals to be recorded at a later stage. It has been found that the relatively short-wave information signals do not erase the servo-information which is present when the medium is overwritten.

The servotracks are preferably provided in such a way that adjacent tracks are magnetically in phase opposition. The position of two servotracks can then be found during writing and/or reading information by moving a read portion of a write/read unit to a position where the output is minimal. The write/read head unit is then present, at an equal amplitude, in the servotracks exactly between two adjacent tracks.

An embodiment of the magnetic head according to the invention is characterized in that, of two adjacent write units, preferably every two adjacent write units-, the write gaps situated in mutually different planes each extend between a magnetically conducting common pole terminating in the head face and an individual pole terminating in the head face. In this embodiment, adjacent write units share one pole, while the individual poles of adjacent write units are alternately present at the one or the other side of the relevant pole.

An embodiment of the magnetic head according to the invention is characterized in that the individual poles of two adjacent write units, preferably every two adjacent write units- are adjacent to the same plane oriented transversely to the width direction. In this embodiment the coplanar individual poles are minimally spaced apart by the pitch of the servotracks on the recording medium, while the effective distance between the tracks is zero. Consequently, a maximum track density for recording on a magnetic medium can be realized. The magnetic head according to the invention is eminently suitable as a buried servowrite head for simultaneously writing a large number of servotracks. The information signals in adjacent tracks are then preferably in phase opposition.

An embodiment of the magnetic head according to the invention is characterized by the presence of a write winding extending between the poles of at least a plurality of write elements. In principle, it is sufficient to use one write winding, one portion of which extends between the common pole and the individual poles in one plane and the other portion extends between the common poles and the individual poles in the other plane, while the write winding is provided with two terminals. In this way, adjacent write elements write in mutual phase opposition. If, for example, the magnetic head is provided, if desired, with a very large number of write elements, the write elements can be provided in groups with a write winding. The proposed write winding can easily be realized technologically by means of known techniques.

An embodiment of the magnetic head according to the invention is characterized in that, of two adjacent write units, preferably every two adjacent write units-, one write unit is provided with two write gaps, one write gap of which is situated in the same plane as the write gap of the other write unit, while the coplanar write gaps extend between two magnetically conducting common poles terminating in the head face, and the other write gap extends between one of the common poles and a magnetically conducting individual pole. This magnetic head, which has technological advantages, is suitable for writing servo-information if, during recording, the recording medium has to be relatively moved in only one direction with respect to the magnetic head. By first bringing the recording medium into magnetic contact with the common poles, a signal is written over a wide range; if the recording medium subsequently establishes magnetic contact with the individual poles, the previously written signal is locally overwritten.

An embodiment of the magnetic head according to the invention is characterized in that the structure is a multilayer structure having layers extending substantially transversely to the head face, at least one write gap of the one write unit and at least one write gap of the other write unit of two adjacent write units, preferably every two adjacent write units- being situated in mutually different layers.

An embodiment of the magnetic head according to the invention is characterized in that, viewed in the width direction of the head face, at least one of the write units has a larger dimension than the other write unit. Servotrack configurations can then be achieved which comprise both clock and position information. During scanning, at least one read unit of a multichannel magnetic head can always scan a complete servotrack. This has the advantage that both the phase of the information in the tracks and the position of the magnetic head with respect to the tracks can be determined.

It is a further object of the invention to provide a device for writing signals in contiguous tracks in a recording medium.

The device for writing information according to the invention comprises the magnetic head according to the invention and means for relatively moving the recording medium with respect to the magnetic head along the head face. The device is eminently suitable for simultaneously writing a large number of servotracks, particularly in such a way that servosignals on adjacent tracks are in phase opposition.

A further object of the invention is to provide a servosystem which can be realized in a simple manner.

The servosystem according to the invention comprises the magnetic head according to the invention for writing servosignals in tracks and further comprises a read head for simultaneously reading information signals and servosignals stored in said tracks. Means are preferably present for moving the read head, particularly for moving the read head in a plane parallel to the plane of the recording medium, in a direction transverse to the tracks of the recording medium, while a servo-information-containing output signal of the read head controls said means. The read head may be a part of a combination head, another part of which is a write head. Since such a write/read head is used for reading information signals as well as long-wave servosignals, the information signals between two servotracks are recorded during writing. In a multichannel read or write/read head, all read channels may in principle be used to read servo-information. This has the advantage that an optimum signal-to-noise ratio can be achieved for the servosignal.

An embodiment of the servosystem according to the invention is characterized in that the read head is provided with a head face and a layer structure comprising parallel read units each having a read gap and extending substantially transversely to the head face, the read gaps of two adjacent read units, preferably every two adjacent write units, each extending between a magnetically conducting common pole terminating in the head face and an individual pole terminating in the head face. An advantage of the read head used, which may form part of a write/read head unit, is that side read effects which could be produced because the servotrack density is large with respect to the wavelength of the servosignals are inhibited. The common pole prevents a read unit from reading servoinformation of adjacent and neighbouring tracks.

It is a further object of the invention to provide a read head for use in the servosystem.

The read head according to the invention has a head face and comprises a layer structure, particularly a thin-film structure comprising parallel read units each having a read gap and extending substantially transversely to the head face, the read gaps of two adjacent read units -preferably every two adjacent write units- each extending between a magnetically conducting common pole terminating in the head face and an individual pole terminating in the head face. Because of its previously mentioned properties, this read head is eminently suitable for use in the servosystem according to the invention.

These and other aspects of the invention will be apparent from and elucidated with reference to the embodiments described hereinafter.

DESCRIPTION OF THE PREFERRED EMBODIMENTS

Figure 1:
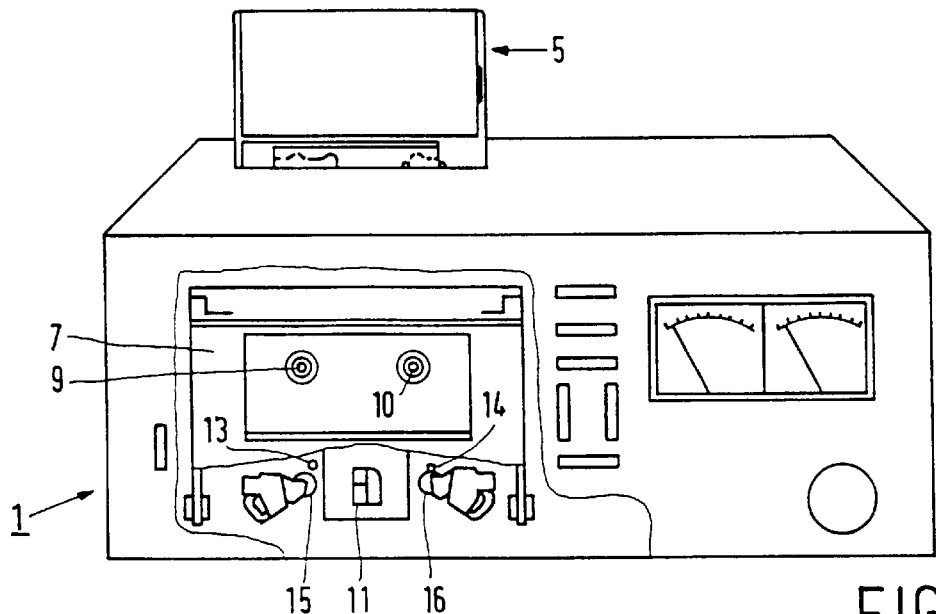
FIG. 1 shows a device according to the invention for writing signals in a tape-shaped recording medium.

The device shown in FIG. 1 is a magnetic tape apparatus 1 which is suitable for cooperation with a magnetic tape cassette 5. The cassette 5 is provided with a magnetic tape which is suitable for storing information in a digital form. The apparatus 1, which is provided with a holder 7 for holding the cassette 5, forms a magnetic tape system together with the cassette 5. The apparatus 1 houses two reel shafts 9 and 10 for cooperation with reel cores of the cassette 5. During use, the magnetic tape is passed along a magnetic head 11 according to the invention used in the apparatus 1. To this end the apparatus 1 is provided with two capstans 13 and 14 and with two pressure rolls 15 and 16 cooperating with the capstans. The magnetic head 11, being a write head, is used for writing a large number of servotracks, for example 65, particularly buried servotracks on the magnetic tape.

Figure 2A:
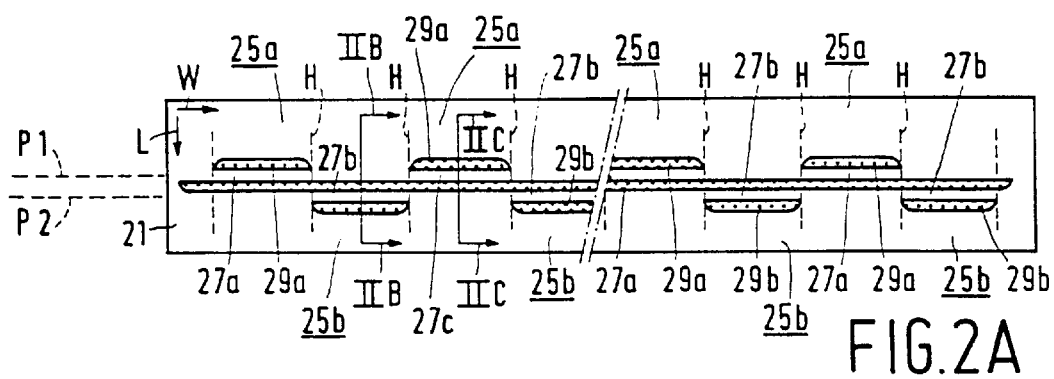
FIG. 2A is a diagrammatic front elevational view of a first embodiment of the magnetic head according to the invention.
Figure 2B:
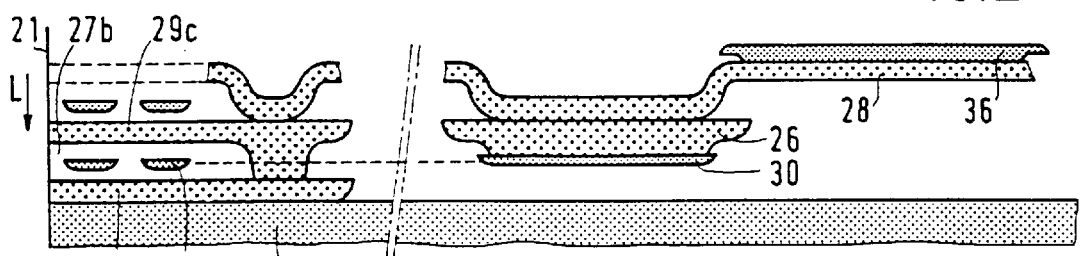
FIG. 2B shows diagrammatically a cross-section IIB—IIB of the first embodiment of the magnetic head.
Figure 2C:
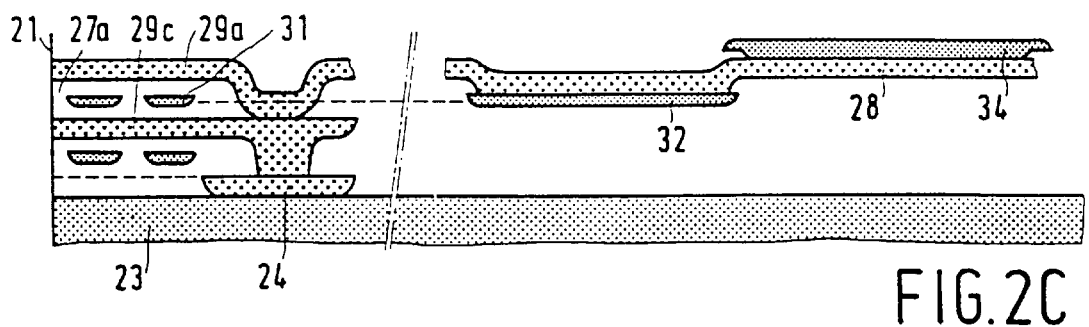
FIG. 2C shows a diagrammatic cross-section IIC—IIC of the first embodiment.
Figure 3A:
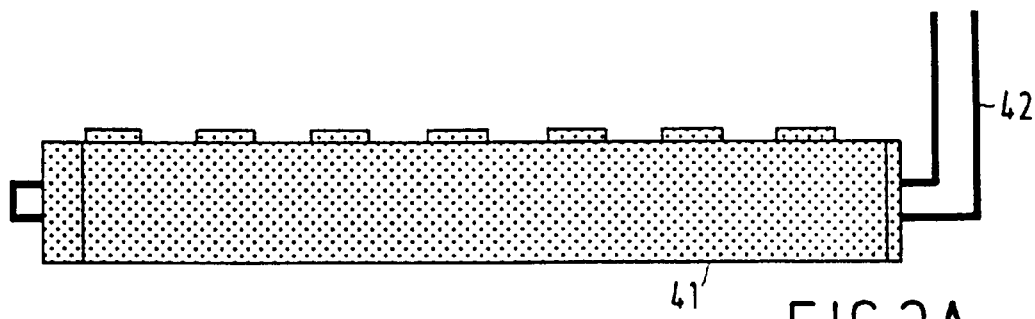
FIG. 3A is a diagrammatic plan view of a second embodiment of the magnetic head according to the invention.
Figure 3B:
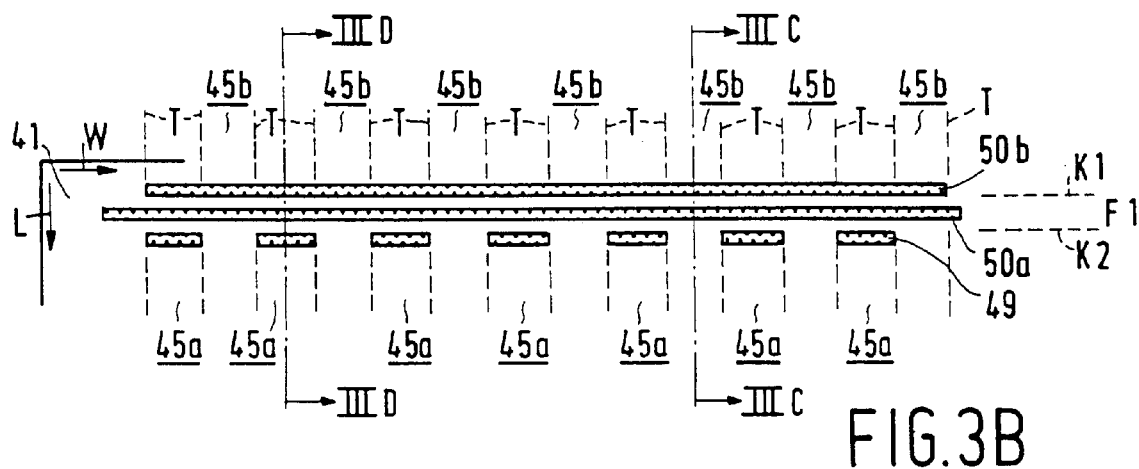
FIG. 3B is a diagrammatic front elevational view of the second embodiment of the magnetic head.
Figure 3C:
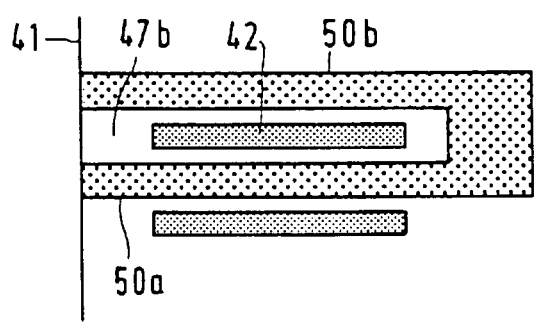
FIG. 3C shows diagrammatically a cross-section IIIC—IIIC of the second embodiment.
Figure 3D:
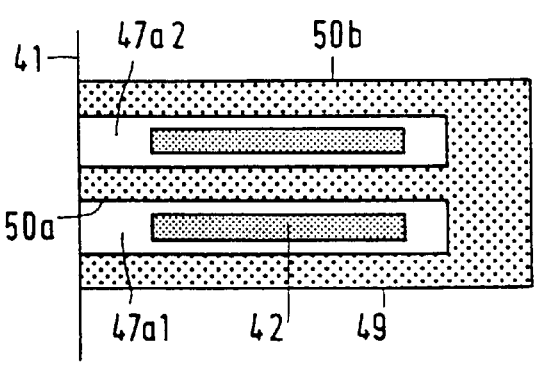
FIG. 3D is a diagrammatic cross-section IIID—IIID of the second embodiment.

The write head according to the invention shown in FIGS. 2A, 2B and 2C is a thin-film magnetic head. The magnetic head has a head face 21 for cooperation with a magnetic recording medium such as a magnetic tape which can be moved with respect to the magnetic head in a direction indicated by the arrow L. The direction L corresponds to the longitudinal direction of the head face 21 which also has a width direction W transverse to the longitudinal direction.

The magnetic head comprises a non-magnetic substrate 23 of, for example a ceramic material such as $Al_2O_3$/TiC on which a multilayer structure is formed by means of known techniques, particularly lithographic techniques. This structure is provided with a plurality of adjacent write units 25a and 25b which extend transversely to the longitudinal direction L and the width direction W, the write units 25a and the write units 25b alternating with each other. The write units 25a and 25b are each provided with a write gap 27a, 27b, respectively, while all write gaps 27a are situated in a first plane P1 extending transversely to the longitudinal direction L and all write gaps 27b are situated in a second plane P2 extending parallel to the first plane P1.

The multilayer structure comprises a first soft-magnetic layer 24 of, for example NiFe, AlFeSi or CoNbZr deposited on the substrate 23. The first layer 24 is structured in such a way that it forms a magnetically conducting individual pole 29b for each write unit 25b. If the substrate 23 is magnetically conducting, an insulation layer should be present between the substrate 23 and the poles 29b. It is also possible to structure a magnetically conducting substrate in such a way that the substrate itself functions as a pole.

The multilayer structure also comprises a second and a third soft-magnetic layer 26 and 28, respectively, which extend parallel to the first layer 24. In principle, the second layer 26 is an uninterrupted layer, while the third layer 28 is structured and forms a magnetically conducting individual pole 29a for each write unit 25a. The second layer 26 forms a common pole 29c for the write units 25a and 25b, each write gap 27a being situated between an individual pole 29a and the common pole 29c, and each write gap 27b being situated between an individual pole 29b and the common pole 29c. For forming appropriate magnetic circuits, the various soft, magnetic layers are interconnected.

The write gaps 27a and 27b situated in the mutually different planes P1 and P2 and comprising a non-magnetic material, for example an oxide such as $Al_2O_3$ or $SiO_2$, are pair-wise adjacent to one and the same plane H being transverse to the width direction W. The individual poles 29a and 29b of every two adjacent write units 25a and 25b are also adjacent to the same plane H.

The multilayer structure further comprises a first electrically conducting layer 30 and a second electrically conducting layer 32 of, for example Cu extending between the first and the second soft-magnetic layers 24 and 26 and between the second and a third soft-magnetic layer 26 and 28, respectively. The electrically conducting layers 30 and 32 are structured and interconnected in such a way that the layers 30 and 31 form write windings 31 and 33 situated in magnetic yokes formed by the poles. The electrically conducting layers 30 and 32 are connected to connection faces 34 and 36 via the electrically conducting soft-magnetic layers 26 and 28, respectively. The individual poles 29a and 29b, as well as the common pole 29c are also connected to connection faces. These are not shown in the drawing. As a protection of the multilayer structure, the magnetic head may be provided with a counter block which is arranged in such a way that the multilayer structure is enclosed between the substrate and the counter block. The counter block may be formed from the same material as that from which the substrate is formed.

The magnetic head according to the invention shown in FIGS. 3A, 3B, 3C and 3D is provided with a head face 41 having a longitudinal direction L and a width direction W and comprises a write winding 42. A magnetic recording medium may be moved along the head face 41 in the direction L or in the opposite direction. The magnetic head is also provided with a structure having integrated write units 45a and 45b which are juxtaposed and extend transversely to the longitudinal direction L and the width direction W and are thus oriented transversely to the head face 41. Of every two adjacent write units 45a and 45b, one write unit, viz. the write unit 45a has two write gaps 47a1 and 47a2 and one write unit, viz. write unit 45b has one write gap 47b. Of these two write gaps 47a1 and 47a2, one write gap, viz. the write gap 47a2 is situated in the same plane K1 as the write gap 47b. The two last-mentioned write gaps 47a2 and 47b extend between two magnetically conducting common poles 50a and 50b terminating in the head face 41. The write gap 47a1, which is situated in a plane K2, extends between the common pole 50a and a magnetically conducting individual pole 49.

In the write head according to the invention shown in FIGS. 3A to 3D, the structure is a multilayer structure having layers extending transversely to the head face 41. The write gaps 47b and 47a1 of every two adjacent write units 4b and 45a, being formed by non-magnetic layers and situated in mutually different planes K1 and K2, are adjacent to the same plane T oriented transversely to the width direction W.

Figure 4:
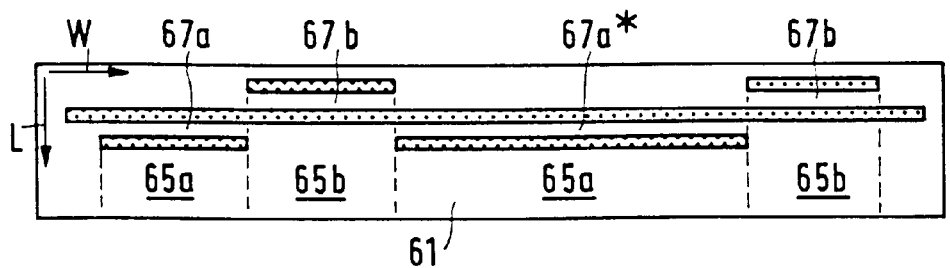
FIG. 4 is a diagrammatic front elevational view of a third embodiment of the magnetic head according to the invention.

The write head according to the invention shown in FIG. 4 is provided with a head face 61 having a longitudinal direction L and a width direction W, on which head face 61 a magnetic recording medium can be moved in the longitudinal direction L. This magnetic head has a configuration of write units which roughly corresponds to that of the write head shown in FIGS. 3A, 3B, 3C. The magnetic head shown in FIG. 4 will therefore be described concisely. The magnetic head has integrated, juxtaposed write units 65a and 65b with write gaps 67a and 67b, respectively. The write gaps of every two adjacent write units 65a and 65b are situated in mutually different planes. Similarly as the embodiments already described, this magnetic head is eminently suitable as a buried servowrite head. In order to add clock and position information during writing of the servotracks, this embodiment is special in that at least one of the write units 65a has a larger dimension, viewed in the width direction W, than the other write units. A wider track, particularly a wider servotrack can be written by means of the wider write gap thereby obtained, denoted by 67a in FIG. 4.

Figure 5A:
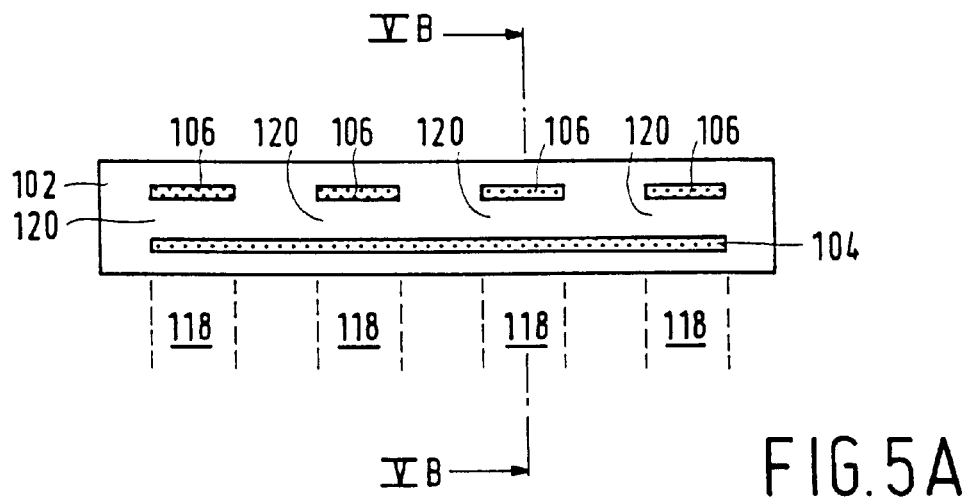
FIG. 5A is a diagrammatic front elevational view of an embodiment of the read head according to the invention.
Figure 5B:
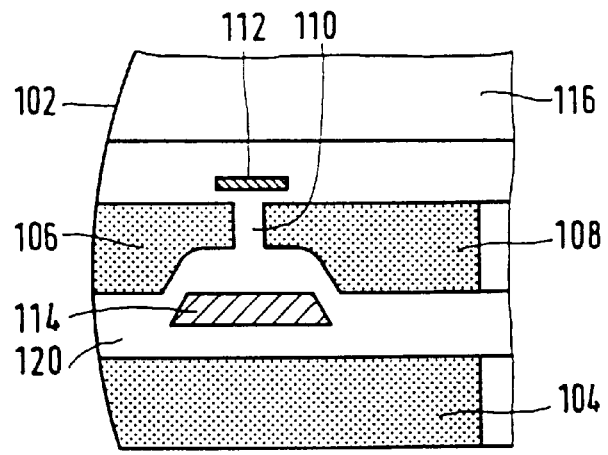
FIG. 5B is a diagrammatic cross-section VB—VB of the embodiment of the read head according to the invention.

The read head according to the invention shown in FIGS. 5A and 5B comprises a thin-film structure and is provided with a head face 102. The thin-film structure, which may be provided on a non-magnetic substrate, comprises a magnetically conducting common pole 104 terminating in the head face 102 and several, i.e. four in the present example, magnetically conducting individual poles 106 terminating in the head face 102. The individual poles 106 with soft-magnetic poles 108 are adjacent to spaces 110 which are bridged by magnetoresistive elements 112. An electrically insulating material such as quartz is present between the various poles. In this example, the thin-film structure has bias windings 114 for magnetically biasing the magnetoresistive elements. Instead of magnetoresistive elements, inductive read elements may alternatively be used. The thin-film structure is protected by a non-magnetic counter block 116.

In the read head shown read units 118 extending transversely to the head face 102 can be distinguished, with each read unit 118 having a read gap 120 which is present between the common pole 104 and one of the individual poles 106. Since the read head according to the invention is not hindered by side read effects due to the use of the continuous common pole 104, the read head is particularly suitable as a buried servoread head.

Figure 6:
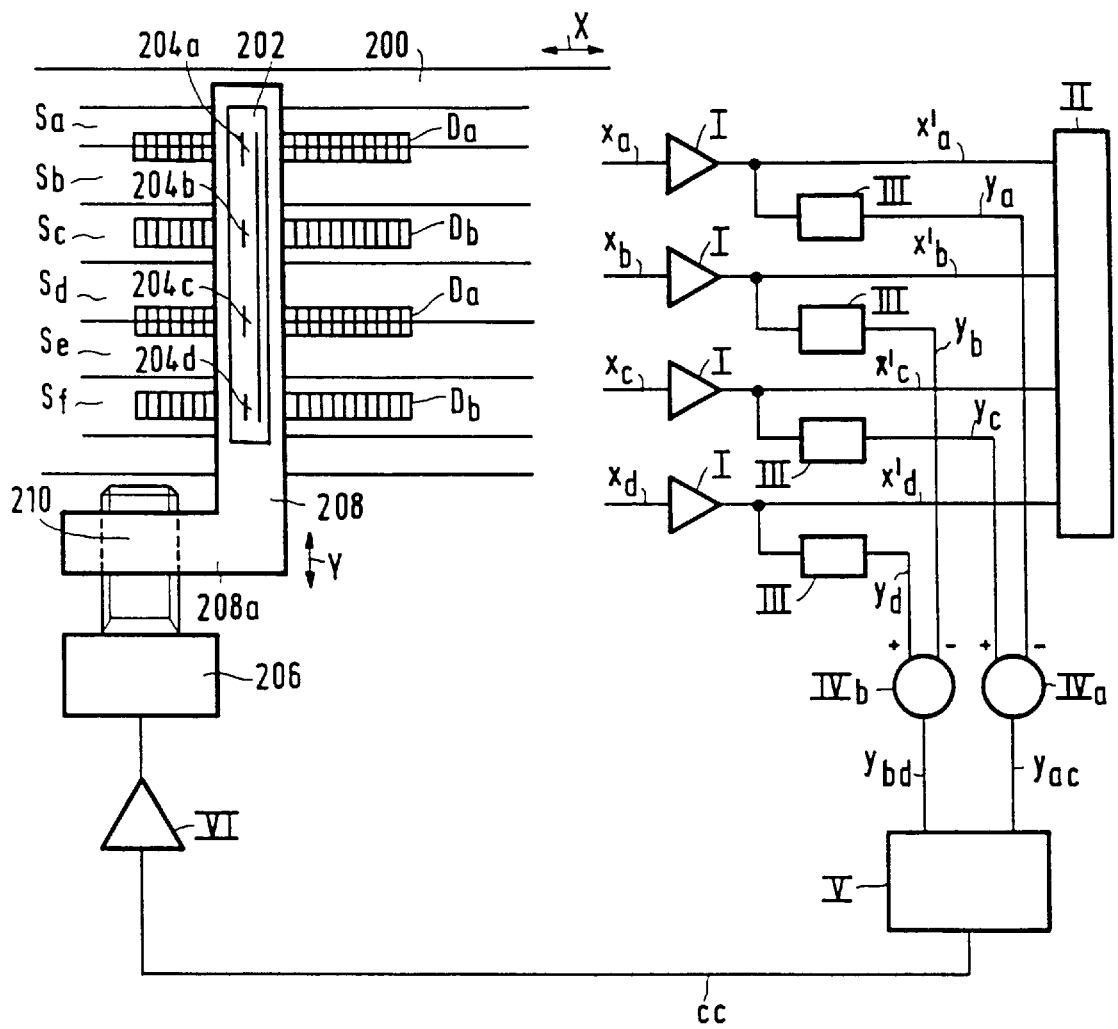
FIG. 6 shows diagrammatically a first embodiment of the servosystem according to the invention.

The servosystem according to the invention shown in FIG. 6 comprises a write head according to the invention and a read head according to the invention. The write head, which is not shown in FIG. 6, is implemented in the way as is shown in FIGS. 2A, 2B, 2C or 3A, 3B, 3C, 3D or FIG. 4. The write head used is provided with six write gaps in this example for writing low-frequency servosignals during formatting of a magnetic tape 200 in six track-sensing or buried servotracks $S_a$, $S_b$, $S_c$, $S_d$, $S_e$ and $S_f$, in which the servoinformation in the tracks $S_a$, $S_c$ and $S_e$ is in phase opposition with the servo-information in the tracks $S_b$, $S_d$ and $S_f$. Information signals can be written on the magnetic tape 200 thus formatted. The write head is positioned in such a way that a short-wave information track $D_a$ is written exactly on the transition between two servotracks. In this example, two information tracks $D_a$ and two information tracks $D_b$ each being present in the middle of a servotrack are present on the magnetic tape 200.

The read head, which is denoted by the reference numeral 202 in FIG. 6, is implemented in the way as is shown in FIGS. 5A, 5B and is provided with four read gaps 204a, 204b, 204c and 204d in this example. The read head 202 is capable of scanning the servotracks and the information tracks simultaneously, so that during reading four read signals Xa, Xb, $X_c$ and $X_d$ become available which have both servo and other information such as data, audio or video information. The signals $X_a$, $X_b$, $X_c$ and $X_d$ are applied to amplifiers I whereafter the outgoing signals $X'_a$, $X'_b$, $X'_c$ and $X'_d$ are applied to a unit II for bit detection and possible equalization and to low-pass filters III all passing low frequency signals $y_a$, $y_b$, $y_c$ and $y_d$. Of these signals, $y_a$ and $y_a$, are position signals and Yb and Yd are clock signals. The position signals $y_a$ and $y_c$, are applied to an adder $IV_a$ and the clock signals are applied to an adder $IV_b$, whereafter a position signal $y_{ac}$ and a clock signal $y_{bd}$ are obtained after suitable adding operations. The two latter signals are applied to a synchronous detector unit V in which the signals are processed to a control signal c with which a position of the read head 202 can be set with respect to the magnetic tape 200. To this end, the control signal c is applied via an amplifier VI to an electric unit 206, in this example a rotation motor, of a head displacement device. The latter device comprises a slide 208 which is journalled in a frame (not shown) in such a way that displacements Y transverse to the tape direction X can be performed. In this example the slide 208 has an arm 208a with an aperture 210 having an internal screw thread through which a shaft 212 having an external screw thread, of the electric motor 206 projects. The read gaps 204a to 204d can accurately and efficiently follow the tracks in the magnetic tape 202 which is displaced in the x direction with the system according to the invention.

Figure 7:
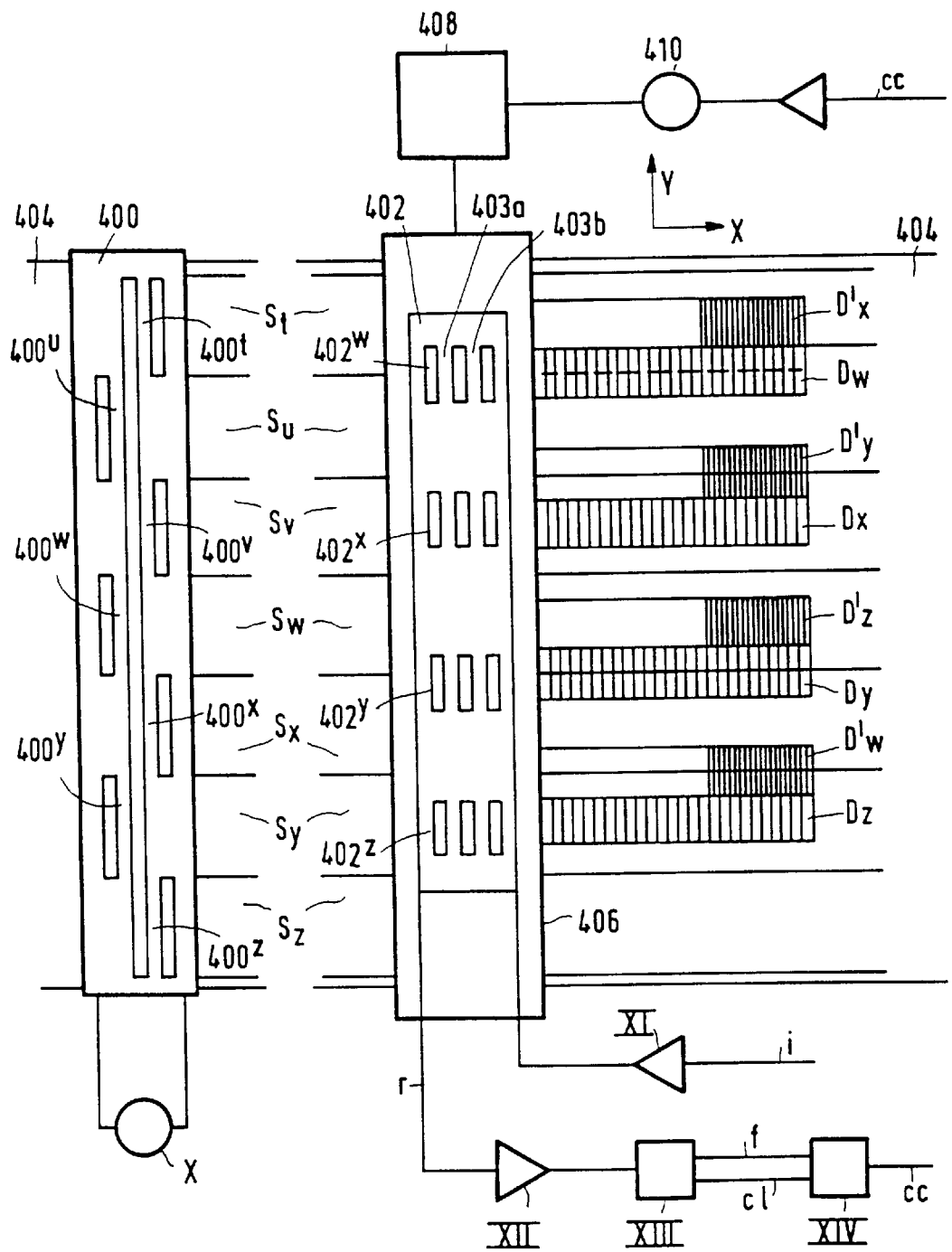
FIG. 7 shows diagrammatically a second embodiment of the system according to the invention.

The servosystem according to the invention shown in FIG. 7 comprises a write head 400 according to the invention and a read/write head 402 according to the invention. The system is adapted to cooperate with a magnetic tape 404 moving in a direction x. The write head 400 is a servowrite head of a type as shown in FIG. 4 and is provided with seven write gaps 400'–400'. After connection of the magnetic head 400 to a current source X, the magnetic tape 404 moving along the magnetic head is simultaneously provided with seven buried servotracks $S_t$–$S_z$ having low-frequency information, with the servosignals in the tracks $S_t$, $S_v$, $S_x$ and $S_z$ being in phase opposition with the servosignals in the tracks $S_u$, $S_w$ and $S_y$. The read/write head, or combihead 402 for short, is provided with four read/write units $402^W$–$402_z$ each having a read gap 403a and a write gap 403b, the read gaps preferably being somewhat narrower than the write gaps, as viewed in the transversal direction Y of the magnetic tape. The combihead 402 is secured to a head displacement unit 406 which is movable in the direction Y which is transverse to the direction X. The unit 406 can be driven by means of an electric unit 410 via a transmission unit 408.

Information signals i, which are applied via an amplifier XI to the combihead 402, can be recorded on the magnetic tape 404 by means of the combihead 402. Four information tracks can be formed simultaneously, for example the tracks $D_w$–$D_z$, while the information tracks $D_w$ and $D_y$ each extend at both sides of the boundary line of two adjacent servotracks, while the information tracks $D_x$ and $D_z$ are entirely present within one servotrack.

During use, the combihead 402 supplies read signals r which comprise long-wave servo-information and, if information signals have already been stored on the magnetic tape, short-wave information. The read signals are applied via an amplifier unit XII to a low-pass filtering unit XIII from which position and clock signals p and d are applied to a synchronous detector unit XIV. The detector unit XIV supplies a control signal cc which is applied to the electric unit 410 via an amplifier XV for continuously setting and correcting the position of the read/write head 402 with respect to the formatted magnetic tape 404. After writing the information tracks $D_w$–$D_z$, further information tracks, for example the tracks $D'_w$–$D'_z$ can be written after moving the displacement unit 406 in the direction Y.

It is to be noted that the invention is not limited to the embodiments shown. For example, the number of transducing gaps may be smaller or larger than the number used in the examples. Moreover, a disc-shaped medium instead of a tape-shaped recording medium may be used.

We claim:

1. A magnetic head, particularly a write head, provided with a head face having a longitudinal direction along which a magnetic recording medium can be relatively moved with respect to the magnetic head, and a width direction oriented transversely to the longitudinal direction, and further provided with transducing gaps terminating in the head face, characterized by the presence of a structure having integrated, adjacent write units extending substantially transversely to the longitudinal direction and the width direction and each of said write units being provided with at least one write gap, said at least one write gap of one of said write units and said at least one write gap of another of said write units of two adjacent write units being situated in mutually different planes which are oriented substantially transversely to the longitudinal direction, and adjacent to the same plane oriented substantially transversely to the width direction, and wherein of said two adjacent write units, one write unit is provided with two write gaps, one of said two write gaps being situated in the same plane as the write gap of the other write unit, while the coplanar write gaps extend between two magnetically conducting common poles terminating in the head face, and the other of said two write gaps extends between one of the common poles and a magnetically conducting individual pole.

2. A magnetic head as claimed in claim 1, wherein of said two adjacent write units, the write gaps situated in said mutually different planes each extend between a magnetically conducting common pole terminating in the head face and a respective individual pole terminating in the head face.

3. A magnetic head as claimed in claim 2, wherein the individual poles of said two adjacent write units are adjacent to the same plane oriented transversely to the width direction.

4. A magnetic head as claimed in claim 2 wherein a write winding extends between the poles of said write units.

5. A magnetic head as claimed in claim 1 wherein the structure is a multilayer structure having layers extending substantially transversely to the head face, said at least one write gap of the one write unit and said at least one write gap of the other write unit of said two adjacent write units being situated in mutually different layers.

6. A magnetic head as in claim 1 wherein the width of the head face, at least one of the write units has a larger dimension than the other write units.

7. A device for writing signals in a magnetic recording medium, comprising a write head as claimed in claim 1 and means for relatively moving the recording medium with respect to the magnetic head along the head face.

8. A servosystem for controlling the position of a magnetic head with respect to tracks of a magnetic recording medium which is relatively moveable with respect to the head and comprises a plurality of juxtaposed tracks, comprising the magnetic head as claimed in claim 1 for writing servosignals in said tracks and further comprising a read head for simultaneously reading information signals and servosignals stored in said tracks.

9. A servosystem as claimed in claim 8, wherein means are provided for moving the read head in a plane parallel to the plane of the recording medium in a direction transverse to the tracks of the recording medium, while a servo-information-containing output signal of the read head controls said means for moving said read head.

10. A servosystem as claimed in claim 8 or 9 wherein the read head is provided with a head face and a layer structure comprising parallel read units each having a read gap and extending substantially transversely to the head face, the read gaps of two adjacent read units each extending between a magnetically conducting common pole terminating in the head face and an individual pole terminating in the head face.

11. A read head for use in the servosystem as claimed in claim 10 or 9 wherein the read head is provided with a head face and a layer structure comprising parallel read units each having a read gap and extending substantially transversely to the head face, the read gaps of two adjacent read units each extending between a magnetically conducting common pole terminating in the head face and an individual pole terminating in the head face.

* * * * *